(No Model.)
D. F. ALLIS.
DEVICE FOR WATERING PLANTS.
No. 318,075. Patented May 19, 1885.
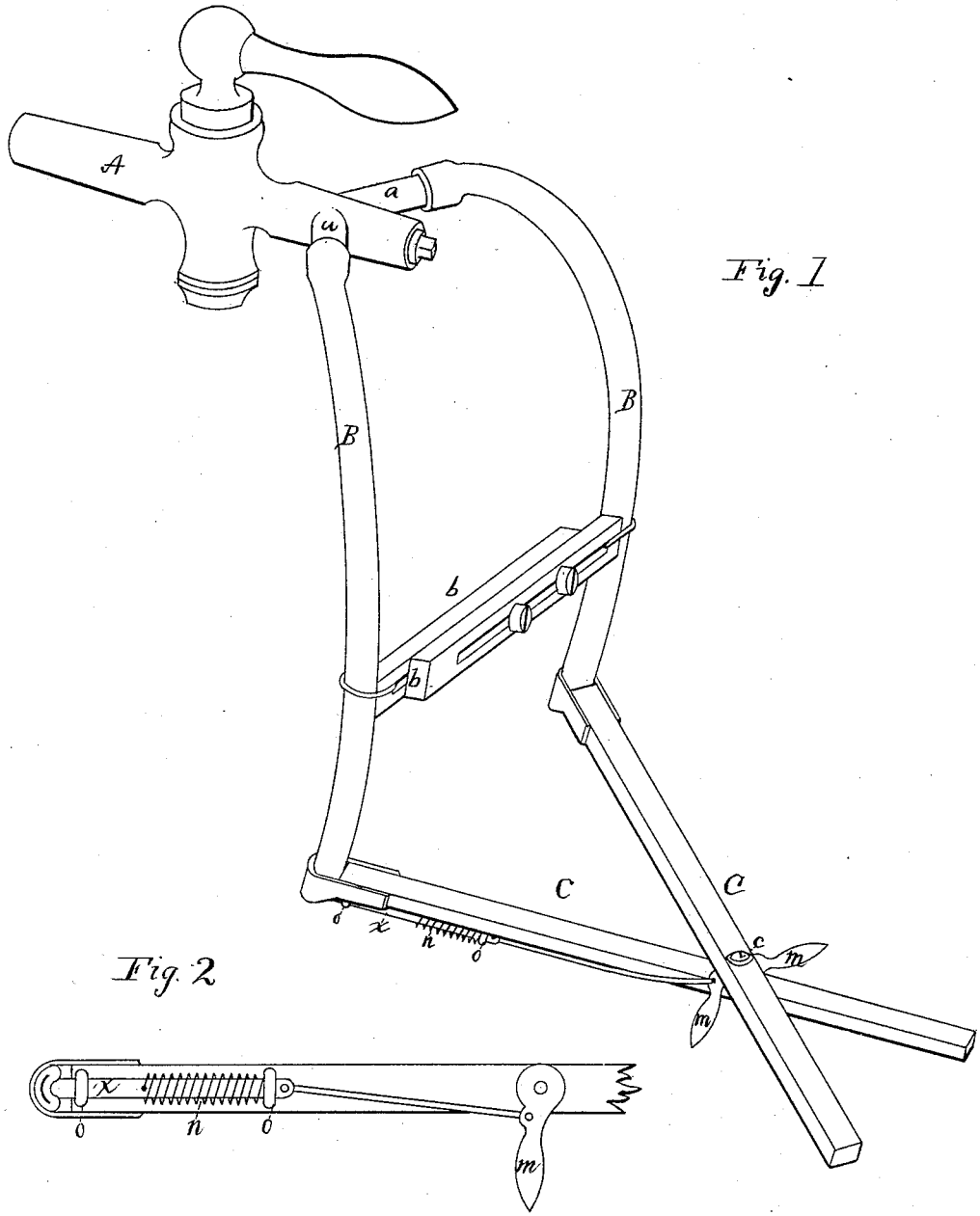
Witnesses
J. Edward Ludington
Daniel S. Glenney Jr.
Inventor
Darwin F. Allis
per George Terry
Atty

UNITED STATES PATENT OFFICE.

DARWIN F. ALLIS, OF CONWAY, MASSACHUSETTS.

DEVICE FOR WATERING PLANTS.

SPECIFICATION forming part of Letters Patent No. 318,075, dated May 19, 1885.

Application filed September 10, 1884. (No model.)

*To all whom it may concern:*

Be it known that I, DARWIN F. ALLIS, a citizen of the United States, residing at Conway, in the county of Franklin and State of Massachusetts, have invented certain new and useful Improvements in Devices for Watering Plants, of which the following is a specification, reference being had therein to the accompanying drawings, in which—

Figure 1 is a perspective view of my device. Fig. 2 is a view of the under side of a portion of one of the adjusting-bars, and shows the means for closing the lower ends of the flexible tubes.

My invention relates to a device for watering plants, spreading fluid fertilizers, and for similar purposes.

The invention consists in attaching to a tank or cask mounted on wheels, so that it may be easily drawn, a cock having perforated lateral arms, to which flexible pipes are fastened, and of means for adjusting the lower ends of the pipes, as the invention is hereinafter more fully described and explained.

To enable others to make and use my improved device, I will give a detailed description of the same.

A, Fig. 1, is the cock, and has the lateral and perforated arms *a*. To these arms the flexible tubes B are attached. These tubes are made of such length as to extend nearly to the ground or to the plants to be watered. One end of each of the overlapping bars *b* is attached to one of the pipes B near its lower end, and the bars are made adjustable by means of a slot in one of the bars and bolts, which pass through the slot into the other bar. The adjusting-bars C are straight bars, which intersect each other, and are pivoted at the point of intersection by means of the bolt *c*. Straps passing around the lower ends of the flexible tubes are fastened near the front ends of the adjusting-bars, and hold the tubes against the ends of the bars. The slide *x* moves in the pieces *o*, attached to the under side of the adjusting-bars. A connecting-rod extends from the slides to the hand-levers *m*. These hand-levers are pivoted or turn on the bolt *c*, which holds together the adjusting-bars. Spiral springs *n* force these slides against the ends of the flexible tubes, compress the ends against the straps, and close the openings of the same.

Constructed and arranged as above described and as shown, the tubes may be adjusted by means of the bars *b* to the distance apart of the rows of plants, and by means of the adjusting-bars C the cultivator, walking between the rear ends of the bars and holding them up, may further adjust the lower ends of the tubes so as to bring them directly over the plants to be watered, and thus, by withdrawing the slides *x* by means of the levers *m*, the water will flow directly upon the plants.

It is obvious that a rose may be attached to the lower end of each tube and the device be used as a sprinkler.

Having described my invention, what I claim as new, and desire to secure by Letters Patent, is—

1. The watering device herein described, consisting, essentially, of the cock A, having the lateral arms *a*, of the flexible tubes B, of the overlapping and adjustable bars *b*, of the adjusting and intersecting bars C, held together by the bolt *c*, and having straps for holding the ends of the tubes, and of the slides *x*, spiral springs *n*, connecting-rods, and hand-levers *m*, all the said parts constructed and combined as shown and described.

2. In a watering device, the adjusting and intersecting bars C, pivoted together and provided with straps for holding the ends of the tubes, in combination with the flexible tubes B, as and for the purpose described.

3. In a watering device, the slide *x*, spiral spring *n*, and connecting-rod arranged on the under side of an adjusting-bar, in combination with a hand-lever and strap fastened to the end of the bar, as set forth.

In testimony whereof I affix my signature in presence of two witnesses.

DARWIN F. ALLIS.

Witnesses:
GEORGE TERRY,
EDWARD LUDINGTON.